United States Patent [19]
Cornwell, Jr. et al.

[11] Patent Number: 4,533,105
[45] Date of Patent: Aug. 6, 1985

[54] TILTABLE DISPLAY MONITOR ASSEMBLY

[75] Inventors: Ross E. Cornwell, Jr., Elmhurst; John F. Czech, Mount Prospect; James D. Domoleczny, Vernon Hills, all of Ill.

[73] Assignee: Zenith Electronics Corporation, Glenview, Ill.

[21] Appl. No.: 605,016

[22] Filed: Apr. 27, 1984

[51] Int. Cl.³ .............................................. A47G 29/00
[52] U.S. Cl. ...................................... 248/371; 248/183
[58] Field of Search ...................... 248/371, 372.1, 395, 248/393, 184, 185, 181, 183, 179, 178, 133, 134, 139, 143, 349

[56] References Cited

U.S. PATENT DOCUMENTS

| | | | |
|---|---|---|---|
| 3,789,140 | 1/1974 | McQueen et al. | 178/7.81 |
| 4,304,385 | 12/1981 | Farouche et al. | 248/181 |
| 4,349,173 | 9/1982 | Volka et al. | 248/346 |
| 4,354,654 | 10/1982 | Werner et al. | 248/371 |
| 4,368,867 | 1/1983 | Pendleton et al. | 248/395 |
| 4,372,515 | 2/1983 | Noonan | 248/178 |
| 4,401,287 | 8/1983 | Moeser | 248/349 |
| 4,410,159 | 10/1983 | McVicker et al. | 248/349 |

*Primary Examiner*—Ramon S. Britts
*Assistant Examiner*—Ramon O. Ramirez
*Attorney, Agent, or Firm*—Cornelius J. O'Connor; Thomas E. Hill

[57] ABSTRACT

A support base for a display monitor provides for the stable orientation of the monitor over a range of tilt angles. An upper portion of the base includes a concave surface adapted to receive a complementary convex lower portion of the display monitor's cabinet. The concave surface of the base includes a pair of spaced, upraised, parallel, elongated, lateral guide rails adapted to receive and engage respective guide rail assemblies positioned on the convex lower portion of the monitor. The convex lower portion of the cabinet is further provided with a center projection for insertion within an elongated center aperture in the concave support surface positioned between the paired guide rails. The center projection is coupled to the base by means of a stretchable element such as an extension spring for applying a moment to the monitor tending to rotate it in a first direction within the concave surface. The biasing spring is coupled to the monitor such that the first direction of rotation is opposite to the rotational moment of the monitor due to its center of gravity. The monitor is thus maintained, once oriented as desired, at a stable tilt angle by these opposing moments. Each of the guide assemblies positioned on the cabinet's lower convex surface includes engaging means such as the combination of a spring washer and tension clip for engaging a respective guide rail in maintaining the monitor firmly positioned within the base's concave surface.

9 Claims, 6 Drawing Figures

TILTABLE DISPLAY MONITOR ASSEMBLY

BACKGROUND OF THE INVENTION

This invention relates in general to video display monitor support structures and is particularly directed to an arrangement for stably orienting a display monitor over a wide range of tilt angles.

Because of the high degree of interaction between the user and a video display monitor in such applications as computer terminals, word processors, communications systems, and video monitoring equipment, the human factors considerations engineered into the display monitor are of the utmost importance, particularly to the user. Such parameters as video display, sweep rates, background color and contrast, and the general viewability of the information presented on the display monitor, which generally includes a cathode ray tube (CRT), all affect the quality of video information provided to the user and the ability of the user to utilize the thus displayed information.

In the area of display monitor viewability, human factors engineering has been primarily concerned with improving the presentation of video information with minimum user inconvenience and hardship. A prime consideration has been directed toward the reduction of glare on the faceplate of the display monitor and achieving and maintaining optimum viewing angles relative to the display monitor. Efforts in these areas to improve the presentation of the video information on the display monitor have been primarily directed to the design and use of various display monitor positioning and tilt mechanisms for minimizing glare while optimizing user viewing angle with minimal inconvenience and adjustment of display monitor orientation.

Various approaches have been used in the prior art to selectively adjust the tilt angle of a display monitor. For example, a rotatably friction cam positioned beneath an aft portion of the video display has been used for the selective vertical displacement thereof in providing the desired tilt angle. Another approach makes use of the combination of a convex lower portion of a display platform and a concave portion of a support stand. The convex portion is inserted within the concave portion in a complementary manner and retained therein by means of a spring-loaded wing nut positioned within a longitudinal slot in a friction plate. By displacing the wing nut-spring combination along the longitudinal slot, the convex and concave surfaces are displaced relative to one another and the platform upon which the display monitor is positioned is tilted as desired. Other approaches involve various complicated arrangements of bellows, flexible members, etc., in combination with various coupled combinations of support links.

One specific prior art approach is disclosed in U.S. Pat. No. 3,789,140 to McQueen et al wherein is described an arrangement for manually tilting the primary image screen of a CRT about a horizontal axis disposed slightly behind the screen by means of a hand wheel exposed through a cabinet enclosing the CRT utilizing a friction pivot on a lateral portion of the CRT. Another approach to a friction pivot-type of CRT tilt arrangement is disclosed in U.S. Pat. No. 4,372,551 to Noonan which provides fore and aft retention by means of a spur gear on an upper support unit and a rack gear on a lower support unit which act to co-locate the origin of the arc of a rocker, the center of gravity, and the origin of the arc of the pitch diameter of the spur gear of the display unit through the tilt range. U.S. Pat. No. 4,410,159 to McVicker et al discloses yet another approach involving a molded base element having a pair of concave tracks in the top and an annular recess in the bottom wherein the concave tracks receive and support a molded cradle element adapted to contain and support a CRT. The annular recess receives an annular support ring adapted to support the base and the cradle with the three assembled CRT support elements maintained in contact with each other by gravity and provided with keepers to maintain assembly of the aforementioned components.

The present invention is intended to overcome the forementioned limitations of the prior art by providing a low cost, reliable, and easily adjusted tilt arrangement for stably positioning a display monitor at a predetermined tilt angle by directly orienting the display monitor as desired. Once properly positioned, the display monitor remains in that orientation until manually displaced. Counterbalancing moments permit the display monitor orientation to be changed with a minimal amount of force.

OBJECTS OF THE INVENTION

Accordingly, it is an object of the present invention to provide for improved viewing of a display monitor.

It is another object of the present invention to provide improved means for adjustably positioning a display monitor for optimum viewing.

Yet another object of the present invention is to provide a low cost, manually adjustable support stand for a display monitor capable of changing the display viewing angle by direct manipulation of the monitor.

A further object of the present invention is to provide for the continuously adjustable positioning of a display monitor over a large angular range, with the display monitor remaining at a fixed viewing angle once positioned as desired.

A still further object of the present invention is to provide a tilt hold mounting arrangement for a display monitor capable of securely maintaining the display monitor at a desired viewing angle once oriented thereat involving direct displacement of the display monitor while eliminating the expense, complexity and imprecise positioning of tilt arrangements having coupling linkage between the tilt control and the display monitor.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
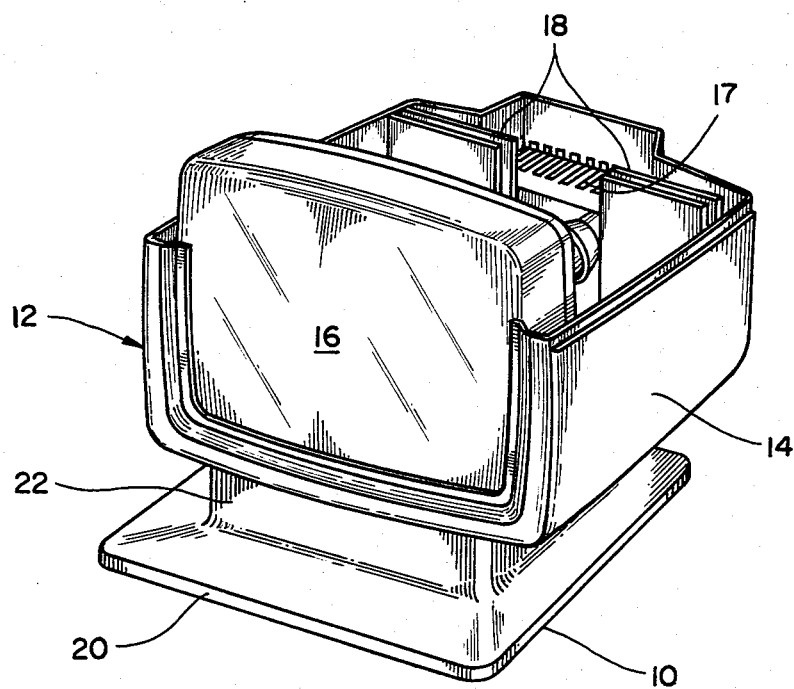
FIG. 1 is a partially cutaway perspective view of a video display monitor positioned upon a support base in accordance with the present invention.

Referring to FIG. 1, there is shown a partially cutaway upper perspective view of a display monitor 12 positioned upon a tiltable display monitor base 10 in accordance with the present invention.

The display monitor 12 includes an outer cabinet 14 within which is positioned a cathode ray tube (CRT) 16 and associated components and circuitry for the proper operation thereof. Mounted in an aft portion of the cabinet 14 are a plurality of circuit boards 18 upon which are mounted various electronic components in a conventional manner. Vents 17 are incorporated in cabinet 14 to provide for the removal of heat generated by the operation of the various electronic components within the cabinet 14.

The support base 10 includes a generally flat lower portion 20 which is positioned upon and supported by a support surface (not shown in FIG. 1). The support base 10 further includes an upraised portion 22 displaced inwardly from the lateral edges of the flat lower portion 20 of the support base 10 and upon which the display monitor 12 rests.

Figure 2:
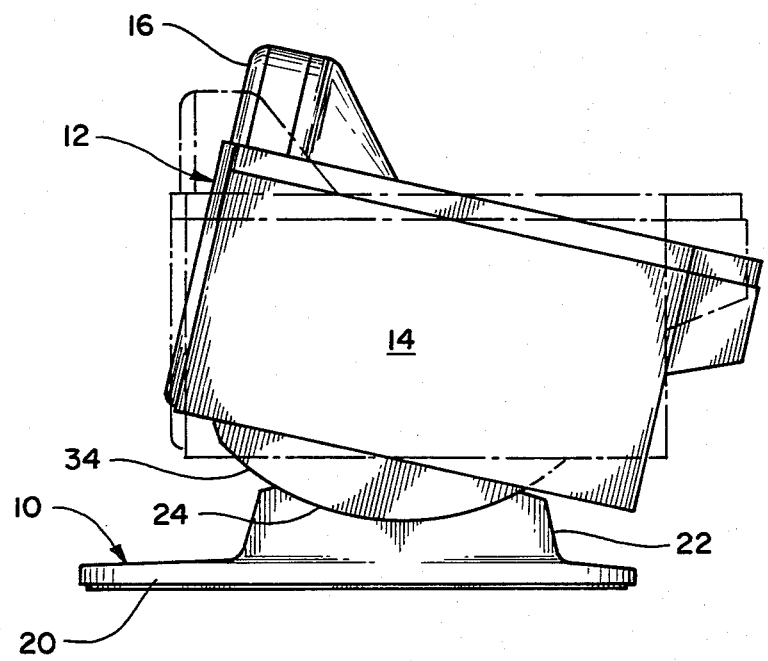
FIG. 2 is a side elevational view of the display monitor and support base combination of FIG. 1 showing the display monitor at several tilt angles.

Referring to FIG. 2, there is shown a side elevational view illustrating two different tilt angles of the display monitor 12. The display monitor 12 is shown in dotted line form with an approximately 0° tilt angle wherein the display monitor is oriented along a generally horizontal axis. The display monitor 12 is also shown in a slightly upward tilted orientation in solid line form therein. From FIG. 2, it can be seen that the upraised portion 22 of the support base 10 includes a concave portion, or surface, 24 within which a complementary convex lower surface 34 of the cabinet 14 is positioned.

Figure 3:
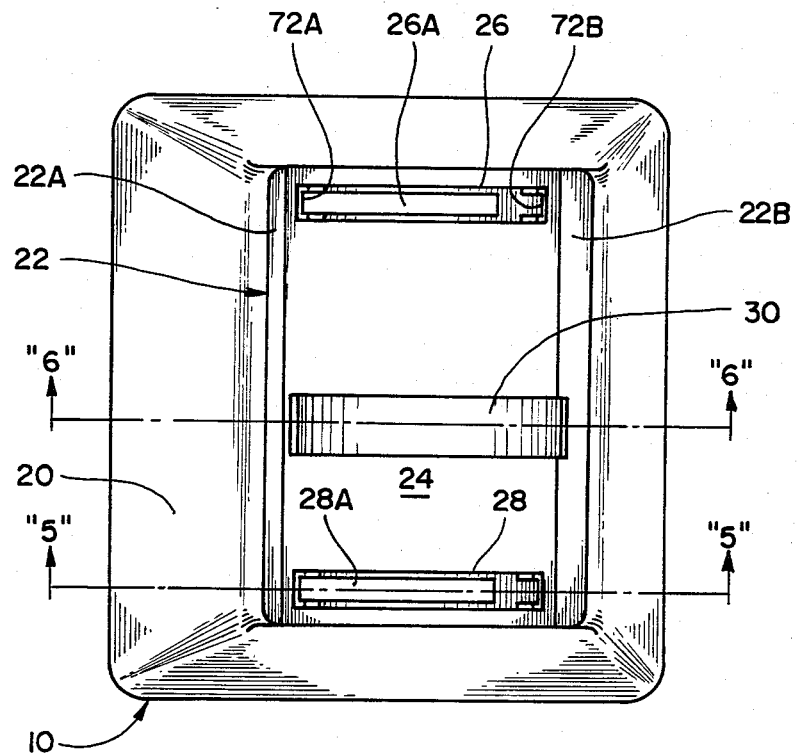
FIG. 3 is a top plan view of the display monitor support base utilized in the present invention.

Referring to FIG. 3, there is shown a top plan view of the support base 10. As shown in the figure, the forward and aft limits of the upper concave surface 24 of the base 10 are defined by forward and aft upper surfaces 22A and 22B. The center of the upper concave surface 24 as well as the center of the upraised portion 22 of the support base 10 is aligned along a front-to-back center line shown as sight line 6—6 in FIG. 3 and is slightly aft of the lateral center line of the support base 10. The slightly rearward displacement of the upraised portion 22 of the support base is due to the weight distribution of the typical display module positioned thereupon. Generally, the center of gravity of a display monitor is located toward the forward portion thereof primarily because of the location of the CRT adjacent the front surface of the monitor. For this reason, the display monitor 12 is supported by the base 10 slightly aft of the lateral center line of the base in order to accommodate the increased weight of the forward portion of the display module.

The upper concave surface 24 is provided with first and second guide rails 26, 28. When viewed from the rear, the first guide rail 26 would be a right guide rail, while the second guide rail 28 would be a left guide rail. Each of guide rails is located adjacent a lateral portion of the upper concave surface 24 of the support base and is provided with forward and aft rotational stops 72A and 72B as shown for the first guide rail 26. The manner in which the forward and aft rotational stops 72A, 72B in the support base 10 limit the rotation of the display module cabinet positioned thereupon is described below. Each of the first and second guide rails 26, 28 is similarly provided with a respective elongated, parallel guide rail aperture 26A, 28A extending substantially along the entire length of a corresponding guide rail. Each of the guide rail apertures 26A, 28A thus forms an arcuate, linear slot within respective lateral portions of the upper concave surface 24 of the support base 10. In addition, as described below, each of the guide rails 26, 28 extends upward above the concave surface 24 upon which they are positioned.

Figure 4:
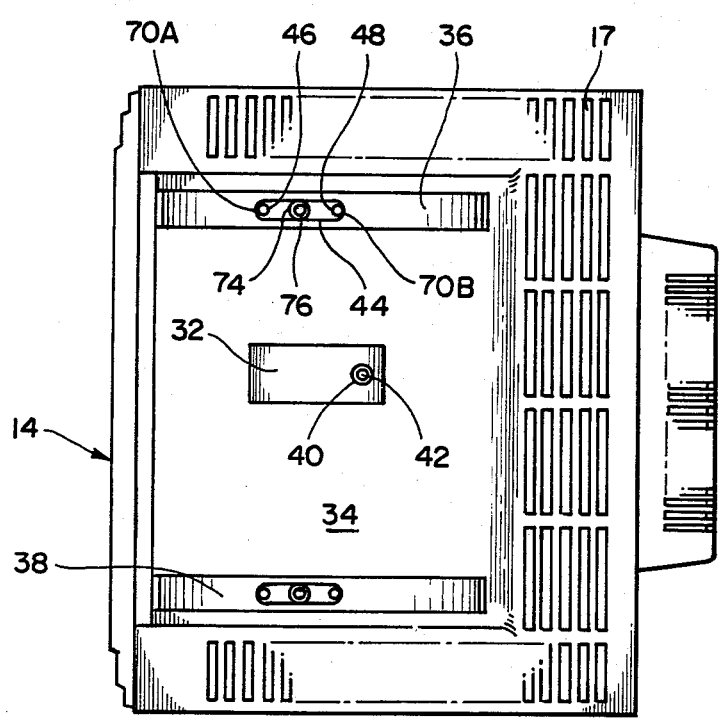
FIG. 4 is a bottom plan view of the lower portion of a display monitor cabinet for use in the present invention.

Referring to FIG. 4, there is shown a bottom plan view of a lower portion of the cabinet 14. Positioned around the bottom portion of the cabinet 14 are a plurality of vents 17 to permit the removal of heat from the cabinet generated by the operation of the electronic components therein. The cabinet 14 includes a lower arcuate convex surface 34 which includes first and second elongated, parallel, spaced slots 36, 38 therein. Each of the slots has a guide assembly 44 which has forward and aft rotational stops, shown for the first slot 36 as elements 70A and 70B. The cabinet rotational stops 70A, 70B contact a corresponding rotational stop 72A, 72B in a respective guide rail on the upper arcuate concave surface 24 of the support base 10 in limiting rotational displacement of the display module as described below. Positioned within each of the first and second slots 36, 38 and extending therefrom is a guide assembly 44. Each guide assembly 44 includes forward and aft bosses 46, 48 extending downward therefrom. In addition, each of the guide assemblies 44 includes a center boss 74 extending downward therefrom which includes an elongated aperture, or slot, 76 therein.

Figure 5:
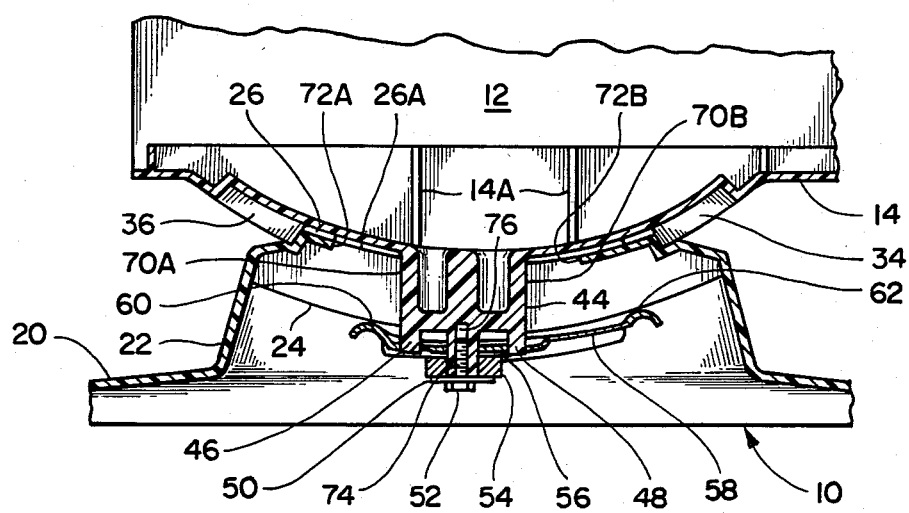
FIG. 5 is a sectional view taken along sight line 5—5 in FIG. 3 showing a display monitor positioned upon a support base in accordance with the present invention.

Referring to FIG. 5, there is shown a sectional view of a display monitor 12 positioned upon a support base 10 taken along sight line 5—5 in FIG. 3 in accordance with the present invention. Each of the guide rails located on the upper arcuate concave surface 24 of the support base 10 is positioned within one of the elongated, parallel, spaced slots in the arcuate convex lower surface 24 of the cabinet 14. As shown in FIG. 5, the first guide rail 26 which includes aperture 26A is positioned within the first slot 36 located on the arcuate convex lower surface 34 of the cabinet 14. Extending downward from the slotted portion of the arcuate convex lower surface 34 is a guide assembly 44 which is positioned within the guide rail aperture 26A in the first guide rail 26. As described with respect to FIG. 4, the guide assembly 44 includes forward and aft bosses 46, 48 as well as a center boss extending downward therefrom. Coupled to the lower portion of the guide assembly 44 by means of the combination of a threaded mounting pin, such as a screw, 52, a washer 50, and a spacer 54 is the combination of a spring washer 56 and a tension clip 58. The spring washer 56 and tension clip 58 each include a plurality of respective apertures within which the forward and aft bosses 46, 48 as well as the center boss 74 are inserted for maintaining alignment of the spring washer and tension clip combination with the first guide rail 26.

Positioned on respective ends of the tension clip 58 are forward and aft arcuate projections 60, 62. With the combination of the spring washer 56 and tension clip 58 positioned upon a lower portion of the guide assembly 44, the forward and aft arcuate projections 60, 62 of the tension clip 58 engage the lower portion of an immediately adjacent portion of the upper arcuate concave surface 24 of the support base 10. With the guide assembly 44 positioned within the guide rail aperture 26A of the first guide rail 26, the display monitor 12 may be rotationally displaced while the forward and aft arcuate projections 60, 62 of the tension clip 58 remain in contact with the lower portion of the upper concave surface 24 of the support base 10. The extent of engagement between the tension clip 58 and the upper arcuate concave surface 24 of the support base 10 may be controlled by means of the threaded mounting pin 52 positioned within the aperture 76 of the center boss 74. Tightening of the threaded mounting pin 52 increases the engaging force between the tension clip 58 and the support base 10. Thus, increased force is required to rotationally displace the display monitor 12. If it is desired to reduce the force required to rotationally displace the display monitor 12, the threaded mounting pin 52 is looseded in order to reduce the force applied by the tension clip 58 to the lower portion of the upper arcuate concave surface 24 of the support base 10.

As stated earlier, the ends of the guide assembly 44 are defined by forward and aft rotational stop surfaces 70A, 70B. As shown in FIG. 5, clockwise rotation of the display monitor 12 will result in abutting contact between the aft rotational stop surface 70B on the cabinet 14 and the aft rotational stop surface 72B on the support base 10. Similarly, counterclockwise rotation of the display monitor 12 will result in abutting contact between the respective forward rotational stop surfaces 70A, 72A of the cabinet 14 and the support base 10. It is in this manner that forward and aft rotation of the display monitor 12 is limited.

Figure 6:
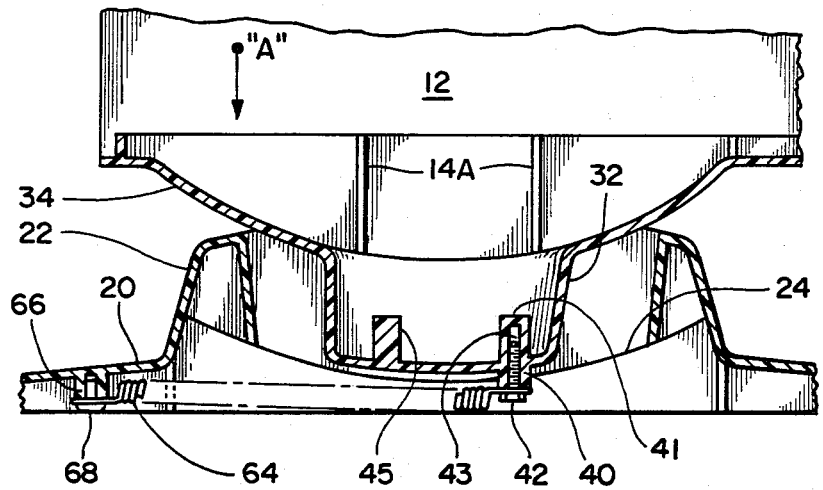
FIG. 6 is a sectional view taken along sight line 6—6 in FIG. 3 showing a display monitor positioned upon a support base in accordance with the present invention.

Referring to FIG. 6, there is shown a sectional view of a display monitor 12 positioned upon a support base 10 taken along sight line 6—6 in FIG. 3 in accordance with the present invention. A lower portion of the cabinet 14 of the display monitor 12 includes a plurality of reinforcing ribs 14A. As shown in FIG. 4, a center projection is positioned upon the arcuate convex lower surface 34 of the cabinet 14 between the two guide assemblies 44 thereon. With the display monitor 12 positioned upon the support base 10, the center projection 32 is positioned within the elongated center slot 30 positioned in the upper arcuate concave surface 24 of the support base 10 and is aligned in parallel with the first and second guide rails 26, 28 therein. The center projection 32 includes forward and aft inner bosses 45, 41 extending from an inner surface thereof. The aft inner boss 41 includes a slot 43 therein in which is threadably inserted a mounting pin 42. Extending downward from the center projection 32 and aligned with the slot 43 in the aft inner boss 41 is a spring mounting boss 40 through which the mounting pin 42 is inserted. One end of an extension spring 64 is coupled to the spring mounting boss 40 by means of the threaded mounting pin 42. The other end of the extension spring 64 is coupled to a spring mounting boss 66 on an inner surface of the support base 10 by means of a threaded mounting pin 68. From FIG. 6 it can be seen that the center portion of the arcuate lower surface 34 of the cabinet is not in contact with any portion of the support base 10. The display monitor 12 is thus supported entirely by the first and second guide rails 26, 28 as previously described.

From FIG. 6 it can also be seen that the extension spring 64 rotationally biases the display monitor 12 in a clockwise direction. The center of gravity of the display monitor is indicated by point A in FIG. 6. The location of the center of gravity of the display monitor 12 is arbitrarily located in FIG. 6. However, it must be located forward of the lowest point of th arcuate convex lower surface 34 of the cabinet 14 in order to counteract the biasing effect of the extension spring 64 for proper operation of the present invention. Therefore, the respective moments of the display monitor's center of gravity and of the extension spring 64 counterbalance one another in providing for the stable positioning of the display monitor 12 over a continuum of tilt angles. While the location of the center of gravity of a given display monitor is fixed depending upon the weight distribution therein, the tensile strength, or elasticity, of the extension spring 64 may be selected for a given display monitor weight and center of gravity location in order to counterbalance the moment thereof.

As previously stated, the center projection 32 is provided with the forward inner boss 45. Although FIG. 6 shows one end of the extension spring 64 coupled to the aft inner boss 41, it may as easily be coupled to the forward inner boss 45 if the center of gravity of the display monitor is positioned aft of the lowest point of the arcuate convex lower surface 34 of the cabinet 14. In this case, the other end of the extension spring 64 would be coupled to an aft, inner portion of the support base 10. In either case, the location at which the extension spring 64 is coupled to the center projection 32 and the location of the display monitor's center of gravity must be on opposite sides of a plane passing through the lowest point of the arcuate convex lower surface 34 of the cabinet 14 in order to provide for the counterbalancing of the aforementioned moments.

There has thus been shown a tiltable display monitor support arrangement which permits the display monitor to be stably positioned over a continuous range of tilt angles. Means are provided for counterbalancing the rotational moment of the display monitor's center of gravity in providing for the rotational equilibrium of the display monitor, the tilt angle of which may be adjusted as desired by merely grasping and rotating the display monitor itself.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A tiltable assembly for a display monitor haaving a convex lower portion for stably positioning said display monitor over a continuum of tilt angles, said assembly base comprising:

a housing having a concave upper portion adapted to receive the convex lower portion of said display monitor when positioned thereupon;

first and second parallel, elongated, arcuate guide rails located in said concave upper portion of said housing;

coupling means for slidably engaging a lower portion of said display monitor with said first and second guide rails, wherein the center of gravity of said display monitor exerts a rotational movement urging said display monitor in a first direction of rotation along said first and second guide rails; and biasing means coupling a lower portion of said display monitor to said housing for urging said display monitor in a second, opposite direction of rotation along said first and second guide rails in counterbalancing the rotational moment of said display monitor's center of gravity in providing for the stable positioning of said display monitor over a continuum of tilt angles.

2. A tiltable assembly in accordance with claim 1 wherein said coupling means are adjustable for controlling the engagement between said display monitor and said guide rails.

3. A tiltable assembly in accordance with claim 1 wherein each of said first and second guide rails includes a respective elongated aperture through which a respective coupling means is inserted.

4. A tiltable assembly in accordance with claim 3 wherein said coupling means includes first and second connecting members inserted through a respective linear aperture in combination with a respective combination of a compression washer and a tension clip and wherein the engagement between said display monitor and said guide rails may be varied by adjusting the force exerted upon said compressive washers.

5. A tiltable assembly in accordance with claim 3 further comprising a third elongated aperture in the concave upper portion of said housing, wherein said third elongated aperture is parallel to said first and second elongated apertures and positioned therebetween, said third elongated aperture adapted to receive a center projection on the convex lower portion of said display monitor and wherein said biasing means couples said center projection to said housing.

6. A tiltable assembly in accordance with claim 5 wherein said biasing means comprises an extension spring.

7. A tiltable assembly in accordance with claim 3 wherein the convex lower portion of said display monitor includes first and second elongated parallel slots each including forward and aft ends thereof, wherein said first and second slots are respectively positioned immediately adjacent and in alignment with said first and second guide rails and wherein the forward and aft ends of said slots form rotation stops when positioned in abutting contact with a respective forward and aft portion of said housing.

8. A tiltable assembly in accordance with claim 1 wherein said housing further includes a generally flat lower base portion extending further in said second direction than said first direction from the center of the concave upper portion of said housing.

9. Apparatus for supporting a video display over a range of selected tilt angles, said video display having a generally convex lower portion and a center of gravity forward of the lowest point of said convex lower portion, said apparatus comprising:

a housing having a concave upper portion and a pair of concave guide rails positioned thereon, said guide rails each having an elongated aperture therein and adapted to receive the convex lower portion of the video display and provide support therefor;

a pair of guide assemblies mounted to the convex lower portion of the video display, wherein each of said guide assemblies is inserted within a respective aperture of a guide rail;

coupling means for coupling each of said guide assemblies to said concave upper portion of said housing, wherein said video display is rotationally displaceable within said guide rails; and resilient biasing means coupling a forward portion of said housing to the convex lower portion of said display at a point aft of the lowest point of the convex lower portion thereof in exerting a first moment upon said video display so as to counterbalance a second moment due to the center of gravity thereof.

* * * * *